United States Patent
O'Mara

(10) Patent No.: US 11,512,762 B2
(45) Date of Patent: Nov. 29, 2022

(54) RIGHT ANGLE MECHANICAL ACTUATOR FOR TENSIONER

(71) Applicant: Opex Corporation, Moorestown, NJ (US)

(72) Inventor: Kerry O'Mara, Moorestown, NJ (US)

(73) Assignee: OPEX Corporation, Moorestown, NJ (US)

(*) Notice: Subject to any disclaimer, the term of this patent is extended or adjusted under 35 U.S.C. 154(b) by 325 days.

(21) Appl. No.: 16/910,734

(22) Filed: Jun. 24, 2020

(65) Prior Publication Data

US 2020/0318716 A1 Oct. 8, 2020

Related U.S. Application Data

(63) Continuation of application No. 62/674,238, filed on May 21, 2018.

(51) Int. Cl.
*F16H 7/08* (2006.01)
*B65G 23/44* (2006.01)

(52) U.S. Cl.
CPC ............ *F16H 7/08* (2013.01); *B65G 23/44* (2013.01); *F16H 2007/0825* (2013.01); *F16H 2007/0842* (2013.01); *F16H 2007/0891* (2013.01); *F16H 2007/0895* (2013.01); *F16H 2007/0897* (2013.01)

(58) Field of Classification Search
CPC ... B65G 23/44; F16H 7/08; F16H 7/10; F16H 7/12; F16H 2007/0857; F16H 2007/0802; F16H 2007/0897; F16H 2007/0842; F16H 2007/0825

USPC ................................................. 198/813, 816
See application file for complete search history.

(56) References Cited

U.S. PATENT DOCUMENTS

| | | | | |
|---|---|---|---|---|
| 1,785,141 A * | 12/1930 | Morton | ................... | B65G 23/00 198/816 |
| 2,443,267 A * | 6/1948 | Owens | ................... | B65G 23/44 248/656 |
| 4,561,538 A * | 12/1985 | Zwiebel | ................. | B65G 23/44 198/816 |
| 5,984,083 A * | 11/1999 | Hosch | ................... | B65G 23/44 198/810.04 |
| 6,170,645 B1 * | 1/2001 | Mitchell | ................ | B65G 23/44 198/816 |
| 6,298,981 B1 * | 10/2001 | Hosch | ................... | B65G 23/44 198/816 |
| 8,910,778 B1 * | 12/2014 | Francisco | ............. | B65G 23/44 198/816 |
| 2004/0087401 A1 * | 5/2004 | Serkh | .................... | F16H 7/1218 474/134 |
| 2008/0268993 A1 * | 10/2008 | Sato | ...................... | F16H 7/0848 474/111 |

* cited by examiner

*Primary Examiner* — James R Bidwell
(74) *Attorney, Agent, or Firm* — Stephen Eland

(57) ABSTRACT

An actuator for transmitting an input force in a first direction from an input mechanism to a force in a second direction at an output mechanism. The actuator may be incorporated into a tensioner for tensioning a belt. The device includes a plurality of aligned spherical elements in a curved raceway. The input mechanism transmits force to a first of the series of spherical elements. The spherical elements are substantially incompressible so that the series of spherical elements transmits the force along the curved raceway from the input mechanism to the output mechanism.

20 Claims, 4 Drawing Sheets

RIGHT ANGLE MECHANICAL ACTUATOR FOR TENSIONER

PRIORITY CLAIM

The present application claims priority to U.S. Provisional Patent Application No. 62/874,238 filed Jul. 15, 2019. The entire disclosure of the foregoing application is hereby incorporated herein by reference.

FIELD OF THE INVENTION

The present invention relates to mechanical actuators for tensioners. In particular, the present invention relates to a right-angle mechanical actuator that has particular application with tensioners.

BACKGROUND OF THE INVENTION

Belts, such as conveyor belts slip if not properly tensioned. Slippage can lead to excess wear and poor performance. Due to belt stretch and other factors belts frequently need to be adjusted to maintain proper tension. However, belts, such as conveyor belts are normally incorporated into a larger overall system. Therefore, it may be difficult to access the belt system in order to adjust the tension. Accordingly, there exists a need for an actuator that adjustment to a tension that has limited access. Similarly, the exists a need for an actuator that reliably provides a linear force along a first axis in response to force in a direction transverse the first axis.

SUMMARY OF THE INVENTION

In view of the foregoing, the present invention provides a tensioner for a belt assembly having a belt entrained around a plurality of rotatable elements. The tensioner includes a housing and a raceway formed within the housing wherein the raceway comprises a first portion extending in a first direction and a second portion extending in a second direction wherein the first direction is transverse the second direction. A plurality of spherical elements may be disposed in the first and second portions of the raceway. The raceway has a width and the diameter of the spherical elements is approximately the same as the width of the raceway so that the spherical elements are serially aligned within the raceway.

The tensioner may also include an input mechanism in operable engagement with a first of the spherical elements in the first portion of the raceway. The input mechanism may be configured to drive the first spherical element in the first direction. Additionally, the tensioner may include an output mechanism configured to be operably connected with one of the rotatable elements of the belt assembly such that displacement of the output mechanism is operable to adjust tension in the belt. The output mechanism may operably engage with a second of the spherical elements in the second portion of the raceway. Additionally, operating the input mechanism may drive the first ball in the first direction thereby displacing the second ball in the second direction, which drives the output mechanism in the second direction thereby displacing the one rotatable element to adjust the tension in the belt.

According to another aspect, the present invention may provide a mechanical actuator for providing an output force. The output force may be a linear force. The actuator may include a housing and a raceway formed within the housing wherein the raceway comprises a first portion extending in a first direction and a second portion extending in a second direction that is transverse the second direction. A plurality of spherical elements may be disposed in the first and second portions of the raceway. The raceway has a width and the diameter of the spherical elements is approximately the same as the width of the raceway so that the spherical elements are serially aligned within the raceway.

The actuator may also include an input mechanism in operable engagement with a first of the spherical elements in the first portion of the raceway. The input mechanism may be configured to drive the first spherical element forwardly. Additionally, the tensioner may include an output mechanism configured to provide an output force. The output mechanism may operably engage with a second of the spherical elements in the second portion of the raceway. Additionally, operating the input mechanism may drive the first ball in the first direction thereby displacing the second ball in the second direction, which may drive the output mechanism in the second direction.

While the methods and apparatus are described herein by way of example for several embodiments and illustrative drawings, those skilled in the art will recognize that the inventive methods and apparatus for tensioning a belt are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

All examples described herein are presented in a non-limiting manner. The embodiment described below are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Figure 1:
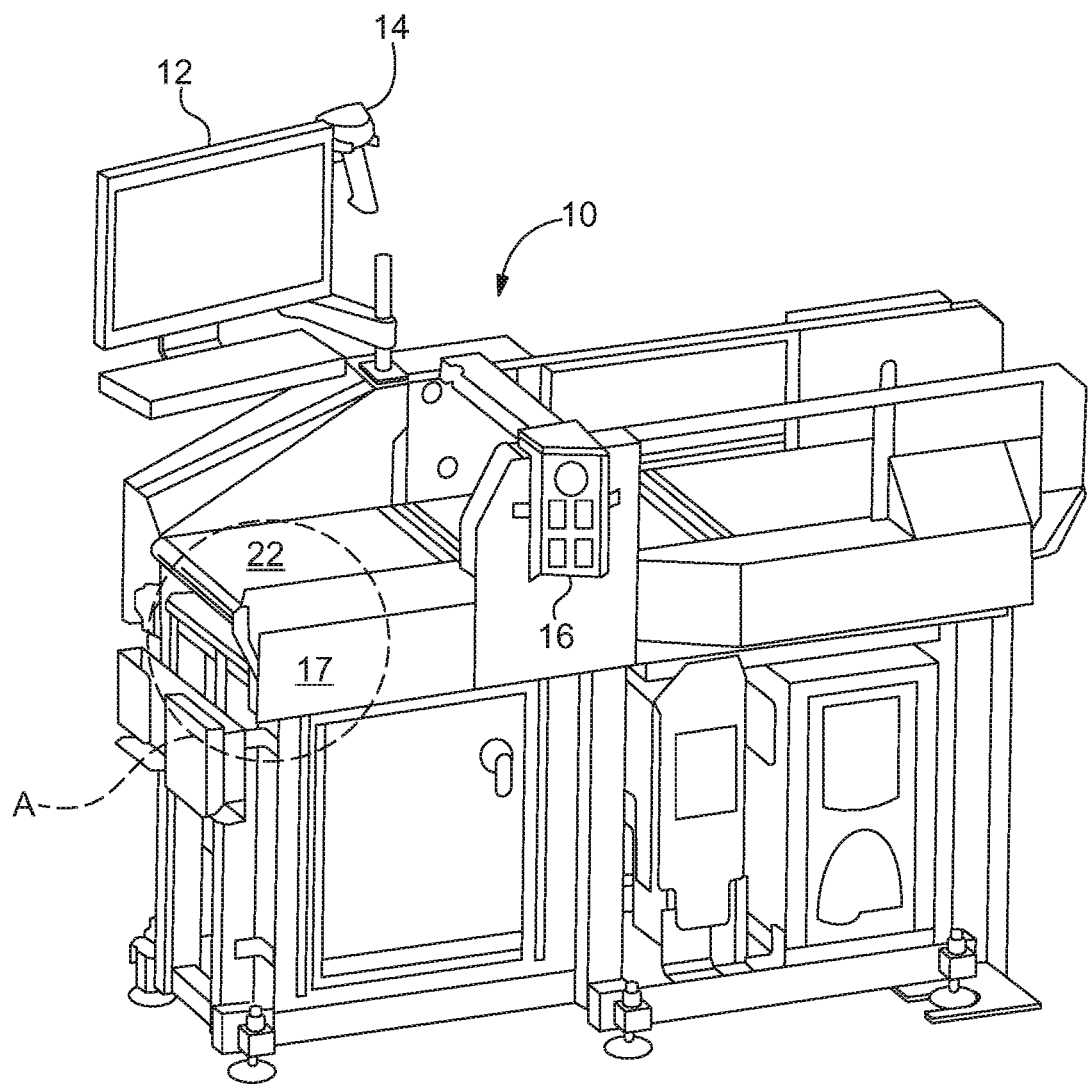
FIG. 1 is a perspective view of an input station having a conveyor assembly.
Figure 2:
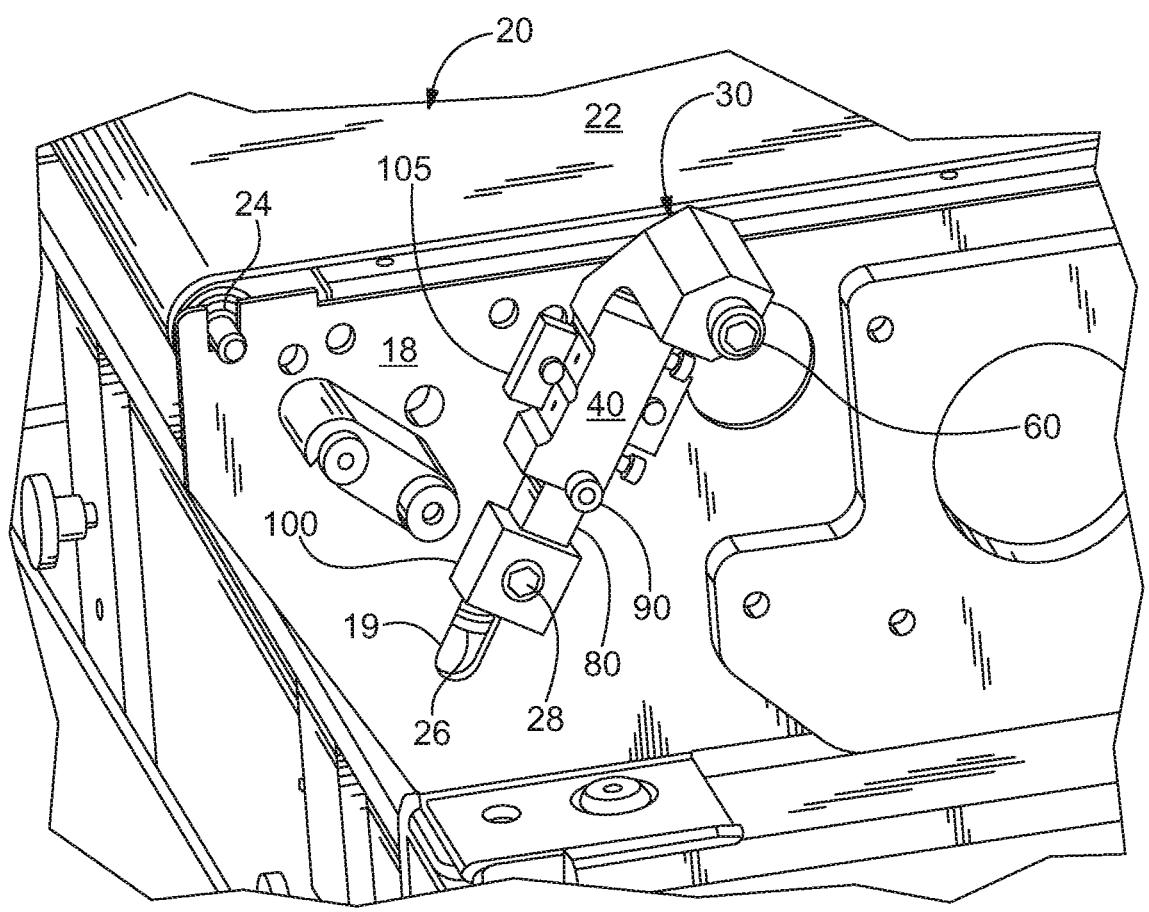
FIG. 2 is enlarged fragmentary perspective view of a portion of the input station of FIG. 1 identified by circle A.

Referring to the figures in general and to FIGS. 1-2 specifically, a workstation is designated generally 10. In the present instance, the workstation is an input station 10 for an automated material handling system. The system 10 includes a conveyor assembly 20 having a generally horizontal conveyor belt 22 so that items can be placed onto the conveyor. An actuator in the form of a tensioner 30 is operable to adjust the tension in the conveyor assembly 20.

As shown in FIG. 1, the input station 10 may be configured so that an operator scans items and places the items on a conveyor belt 22 that moves the items forwardly into the system. The station may include a handheld scanning device 14, such as a bar code scanner or the station may include a scanner for automatically scanning items as the items are conveyed along the conveyor. The station may also include a display 12 for displaying operational information for the operator and/or information regarding the items scanned during operation. Additionally, the station 10 may include one or more controls 16 for controlling operation of the system. For instance, the controls may include a shut off button for stopping operation of the conveyor system 20. The details of an exemplary input station are described and illustrated in U.S. Pub. Pat. Appl. No. US2017/0320102 published on Nov. 9, 2017. The entire disclosure of US2017/0320102 is hereby incorporated by reference. It should be understood that the tensioner or actuator described below may be incorporated into the structure of the system described in US2017/0320102. Although the system is illustrated as being an input station for a material handling system, it should be understood that the conveyor assembly and tensioner may be used in any of a variety of systems that incorporate a belt that is entrained about one or more rollers, pulleys or other rotatable items.

Referring to FIG. 2, the portion of the input station 10 identified by circle A in FIG. 1 is shown in greater detail. In FIG. 2, portions of the input station in FIG. 1 are shown with one or more covers, such as cover 17, removed so that elements beneath the covers are visible. In particular, a sidewall 18 is a generally planar vertical wall that is visible when the cover 17 is removed. The sidewall 18 encloses one side of the conveyor assembly 20. The conveyor assembly includes a wide generally horizontal conveyor belt 22. The conveyor belt spans substantially across the width of the input station so that items nay be dropped or placed onto the top surface of the conveyor belt. The conveyor belt is configured to advance the items forwardly after being placed on the belt 22.

The belt 22 is entrained around a plurality of rollers. For instance, as shown in FIG. 2, the belt 22 is entrained around a head roller 24 adjacent the left end of the input station 10. Additionally, the belt 22 is entrained around a tensioning roller 26. An edge of the tensioning roller 26 can be seen through a slot 19 in the sidewall 18. The slot 19 is an elongated slot and the tensioner roller 26 has a central axle 28 that extends through the slot. The axle 28 engages a slidable block 100. In particular, the axle may extend through the thickness of mounting block 100 so that the end of the axle projects through the block.

A tensioner 30 engages the mounting block 100 to adjust the position of the axle to adjust the tension in the conveyor belt 22. In particular, by actuating the tensioner 30, the tensioner is configured to drive the mounting block 100 and connected axle 28 downwardly and to the left from the perspective of FIG. 2. Displacing the axle 28 displaces the tensioner roller toward the belt 22 to increase the tension in the belt.

Figure 3:
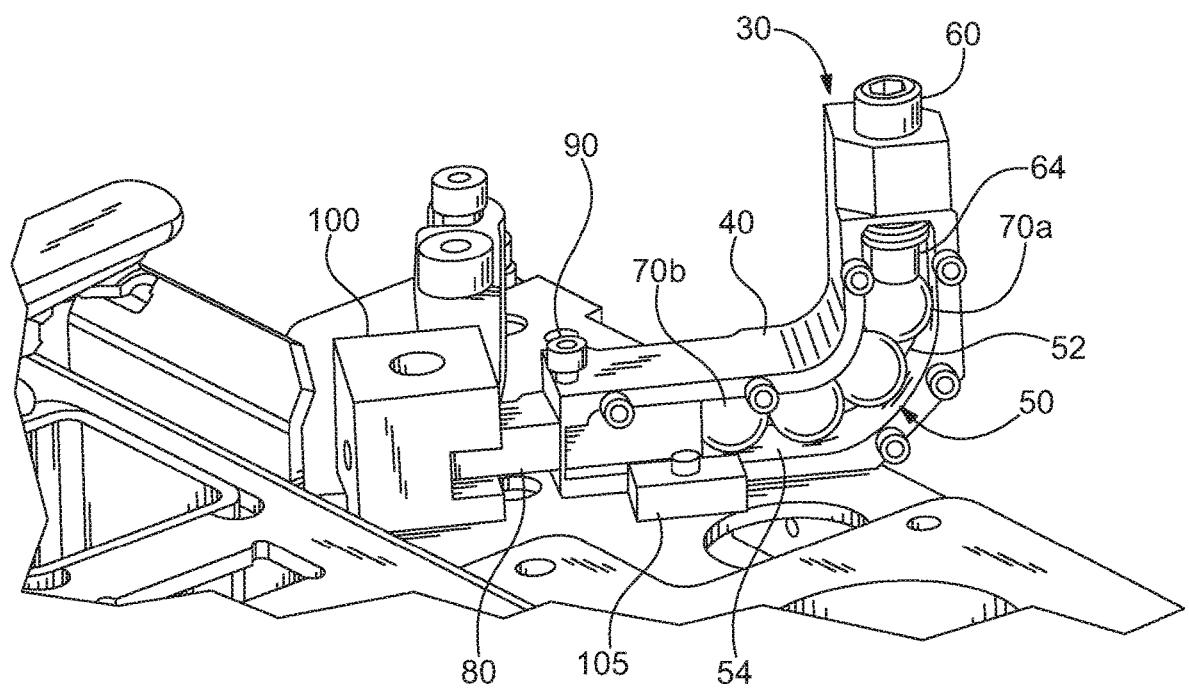
FIG. 3 is enlarged perspective view of a tensioner for tensioning the conveyor assembly illustrated in FIG. 1.
Figure 4:
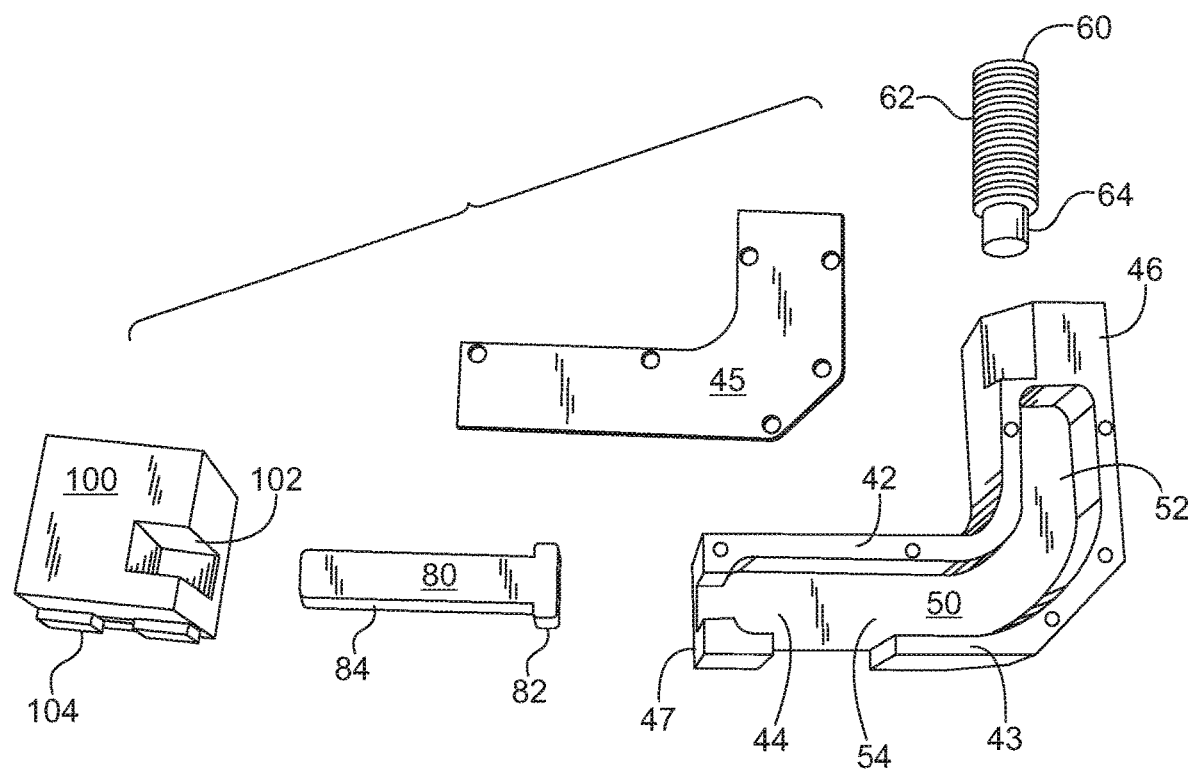
FIG. 4 is an exploded perspective view of elements of the tensioner illustrated in FIG. 3.

Referring to FIGS. 3-4 the details of the tensioner will be described in greater detail. The tensioner 30 includes a hollow housing 40 having an internal raceway for receiving a plurality of spheres such as metal ball bearings 70. At one end an input mechanism 60 is operable to apply a force to drive one of the ball bearings forwardly. The input force is transmitted through the ball bearings to an output mechanism 80. The output mechanism 80 engages the mounting block 100 so that the force from the input mechanism in transferred to the mounting block 100 to displace the mounting block.

The housing 40 has an upper wall 42 that projects upwardly from a back wall 44. A lower wall 43 is spaced apart from and substantially parallel with the upper wall. The lower wall 43 is connected with and projects upwardly from the back wall 44. A channel or raceway 50 is formed between upper wall 42 and low wall 43. As shown in FIG. 4, the raceway is curved having a first portion 52 extend in a first direction and a second portion 54 extending in a second direction that is transverse the first direction. In the present instance, the second direction is generally normal to the first direction, but it should be understood that the angle between the first and second directions may vary depending upon the application and the configuration of the system. Additionally, the path of the raceway may include more than one section that is angled or curved. Further still, the path of the raceway may turn in different directions and different planes.

A plurality of force transmitting elements are disposed within the housing 40. In the present instance, the force transmitting elements are spheres, such as ball bearings 70. The ball bearings are selected so that the bearings are readily aligned within the raceway and easily displaceable within the raceway. In particular, the diameter of the spheres 70 is slightly less than the distance between the upper wall 42 and the lower wall 43. Similarly, the diameter of the spheres 70 is slightly less than height of the upper and lower walls 42, 43. In this way, the spheres are readily displaceable within the raceway 50. Additionally, since the ball bearings 70 have a diameter that closely corresponds with the height and width of the raceway, the raceway aligns the ball bearings into a single line with the center of each ball bearing aligned along the centerline of the raceway. A cover 45 covers the raceway 50 to enclose the ball bearings 70 within the housing 40.

As shown in FIG. 4, a first end wall 46 forms a wall at a first end of the first portion 52 of the raceway 50. The first end wall forms a stop at the end of the first portion 52 that impede the ball bearings from exiting the raceway. Similarly, a second end wall 47 forms a wall at a second end of the second portion 54 of the raceway 50. The second end wall forms a stop at the end of the first portion that impedes the ball bearings 70 from exiting the raceway. An input mechanism 60 projects into the first portion 52 of the raceway 50 to engage one of the ball bearings 70. The input mechanism 60 may be displaceable along an axis that is parallel with a central axis of at least part of the first portion 52 of the raceway 50. Specifically, the input mechanism may be displaceable along the first direction.

One exemplary input mechanism is a threaded element. As shown in FIG. 4, in the present instance the input mechanism 60 is a set screw having an elongated threaded body 62. A threaded hole extends through the end wall 46 into the first raceway portion 52. Preferably, the threaded hole has a smaller diameter than the diameter of the ball bearings 70. The input mechanism 60 threadedly engages the threaded opening in the end wall. Additionally, the end of the input mechanism 60 is configured to engage one of the ball bearings in the raceway. The end of the input mechanism can be any of a variety of configurations operable to transmit force to the ball bearings. In the present instance, the input mechanism may be a set screw having an extended point 64 having a flat engagement surface, such as a full dog or half dog point.

An output mechanism 80 is positioned at the end of the raceway 50 remote from the input mechanism 60. The output mechanism 80 may be displaceable along an axis that is parallel with a central axis of at least part of the second portion 54 of the raceway 50. Specifically, the output mechanism may be displaceable along the second direction.

The output mechanism 80 is displaceable in response to force applied by the input mechanism 60. The output mechanism may have a first portion disposed within the housing 40. The first portion may be displaceable along the raceway 50. Additionally, the output mechanism 80 may have a second portion that extends outside the housing 40. For instance, in the present instance, the output mechanism may be a plunger. The plunger may have an enlarged head 82 configured similarly to the cross section of the raceway 50. In this way, the head 82 may engage the raceway to align the plunger within the raceway. The plunger 80 may also include an elongated body 84. In the present instance, a first end of the body 84 is connected to the head 82 and the second end projects out of the housing. In particular, an opening for the plunger may extend through the second end wall 47. The opening is configured to allow the body 84 of the plunger 80 to slide through the opening in the end wall 47. The plunger body may be generally cylindrical, however, in the present instance, the plunger body is a bar-shaped rod having a generally rectangular cross section. In this way, the plunger includes a flat engagement surface extending along the length of the plunger.

The tip of the plunger 80 extending from the housing 40 operably engages the mounting block 100. A linkage may interconnect the output mechanism and the mounting block, but in the present instance the plunger directly engages the mounting block. The mounting block 100 comprises a bore configured to receive the end of the axle 28 of the tensioner roller. Additionally, the mounting block may be configured to positively engage the output mechanism. For instance, the mounting block 100 may include a notch 102 configured to receive the tip of the plunger 80. Additionally, the mounting block may include an alignment element for guiding displacement of the mounting block. For instance, in the present instance the mounting block may include one or more alignment tabs 104. The alignment tabs may be configured to engage and slide within the slot 19 in the sidewall 18 of the input device 10. In this way, the alignment tabs may guide the mounting block so that the mounting block is displaceable along a path parallel to the longitudinal axis of the slot 19. In this way, the axle 28 is displaceable along a path parallel to the slot 19.

As shown in FIG. 2, the tensioner is mounted on the sidewall 18 of the input station 10. As shown in FIGS. 3 and 4, the mounting bracket 105 may engage a cut-out in the side of the lower wall 43. A mounting bracket 105 connected with the housing 40 may be bolted onto the sidewall to rigidly attach the tensioner to the sidewall. In this way, the position of the tensioner relative to the conveyor assembly 20 is substantially fixed.

Configured as described above, the tensioner 30 operates as follows. To increase the tension in the conveyor belt 22, the input mechanism 60 is actuated. Actuating the input mechanism 60 applies a force to the first ball 70a in the first portion 52 of the raceway. Specifically, rotating the set screw 60 in a first rotational direction drives the tip 64 of the set screw into the housing. As the set screw is advanced, the tip 64 engages the first ball 70a urging the first ball forwardly along the raceway. The balls 70 are generally incompressible. Additionally, the raceway is configured to maintain the balls in a single line with the center of each ball aligned with the center point of the adjacent ball bearings. In this way, the force applied to the first ball bearing 70a is transmitted through the line of ball bearings to the last ball bearing 70b in the second portion 54 of the raceway. The last ball bearing 70b engages the output mechanism 80. In this way, the series of ball bearings transmits the force from the input mechanism to the output mechanism. Additionally, the series of ball bearing transmits the force from the input mechanism from a first direction to a second direction. In particular, the series of balls transmits a linear force around a curve or angle so that an input force is a first direction is transmitted as an output force in a second direction that is transverse the first direction.

Specifically, rotating the set screw 60 in a first rotational direction drives the series of ball bearings forwardly along the raceway 50, thereby driving the plunger 80 forwardly. The plunger slides through the opening in end wall 47 to drive the mounting block 100 forwardly. Since the axle of the tensioning roller is connected with the mounting block, advancing the block 100 along the slot 19 in the sidewall 18 drives the tensioning roller toward the belt 22 to increase the tension in the belt.

Since the input mechanism 60 is a threaded element, the tensioner can incrementally increase the tension by incrementally rotating the set screw until the belt 22 is properly tensioned. Because the input mechanism is a threaded element, the tensioner may remain in the tensioned position. However, it may be desirable to incorporate a locking element that is operable to retain the tensioner in the tensioned position after the belt is tensioned. Accordingly, in the present instance, the tensioner 30 includes a plunger lock 90 that impedes displacement of the plunger 80. The plunger lock may be any of a variety of locking elements. In the present instance, the plunger lock is a locking screw 90. The housing may include a threaded hole that extends into the inside of the housing. The locking screw 90 may threadedly engage the threaded opening so that the end of the locking screw extends into the housing. The threaded opening is aligned with the body of the output mechanism so that the locking screw is positioned to engage the output mechanism. In the present instance, the locking screw is positioned and oriented so that the tip of the locking screw can engage the flat side of the plunger body 84. In this way, after the tension in input mechanism is operated to apply the appropriate tension in the belt, the locking screw is rotated until the tip of the lock screw 90 locks down against the plunger to impede axial displacement of the plunger.

In the foregoing discussion, the tensioner 30 has been described as a mechanism for increasing the tension for a conveyor belt. However, it should be understood that the structure of the tensioner has broader application as a mechanical actuator for other systems that do not relate to tensioning a belt. In particular, the tensioner 30 may be applied to any of a variety of applications in which it is desirable to apply an input force in a first direction that is converted to an output force in a second direction that is transverse the first direction. Accordingly, the tensioner can broadly be considered an actuator having an input mechanism and an output mechanism. Application of a first force to the input actuator is transmitted to an output mechanism via the series of balls so that the output force is along a transverse direction.

Additionally, in the foregoing description, the force applied to the input mechanism is transferred to the output mechanism via a series of elements in the raceway 50. The elements are configured to allow transmission of the force around a curved or angled section. In the preceding description, a series of spheres extend the length of the raceway 50 to functionally connect the input mechanism with the output mechanism. However, it should be understood that one or more elements may be included in between the input mechanism and the output mechanism. For instance, one or more compliant elements may be included in the raceway. By way of example, one or more elastic or biasing elements may be incorporated between the input element and the output element. For instance, the actuator may include a coil spring having a first end bearing against the plunger and a second end bearing against the spring. The bias in the spring may be sufficient to transmit the force from the input mechanism to the output mechanism. However, in an overload situation the spring may flex to prevent damage that could be caused if the output mechanism is advanced. Accordingly, while the foregoing description describes the system as including a series of spheres for transmitting the force, it should be understand that one or more other elements may be inserted in the device between one or more of the spheres or other elements that transmit the input force along a non-linear path to the output mechanism.

While the foregoing is directed to embodiments of the present invention, other and further embodiments of the invention may be devised without departing from the basic scope thereof, and the scope thereof is determined by the claims that follow.

What is claimed is:

1. A tensioner for a belt assembly having a belt entrained around a plurality of rotatable elements, wherein the tensioner comprises:
    a housing;
    a raceway formed within the housing wherein the raceway comprises a first portion extending in a first direction and a second portion extending in a second direction wherein the first direction is transverse the second direction;
    a plurality of spherical elements disposed in the first and second portions of the raceway, wherein the raceway has a width and the diameter of the spherical elements is approximately the same as the width of the raceway so that the spherical elements are serially aligned within the raceway;
    an input mechanism in operable engagement with a first of the spherical elements in the first portion of the raceway, wherein the input mechanism is configured to drive the first spherical element in the first direction;
    an output mechanism configured to be operably connected with one of the rotatable elements of the belt assembly such that displacement of the output mechanism is operable to adjust tension in the belt;
    wherein the output mechanism is operably connected with a second of the spherical elements in the second portion of the raceway;
    wherein the input mechanism is configured such that operating the input mechanism drives the first ball in the first direction which displaces the second ball in the second direction, which drives the output mechanism in the second direction thereby displacing the one rotatable element to adjust the tension in the belt.

2. The tensioner of claim 1 comprising a releasable lock configured to lock the output mechanism in place to impede displacement of the output mechanism against displacement in the second direction.

3. The tensioner of claim 1 wherein the output mechanism comprises a plunger having a first portion disposed within the second portion of the raceway and a second portion extending out of the raceway.

4. The tensioner of claim 1 wherein the output mechanism is a linearly displaceable plunger.

5. The tensioner of claim 1 wherein the raceway comprises a curved pathway that includes the first and second portions.

6. The tensioner of claim 1 wherein the raceway comprises a channel having sidewalls for retaining the spherical elements.

7. The tensioner of claim 1 wherein the input mechanism is threadedly connected with the housing so that rotating the input mechanism in a first rotation direction displaces the first spherical element in the first direction.

8. The tensioner of claim 1 wherein the spherical elements are ball bearings.

9. The tensioner of claim 1 wherein the spherical elements are substantially incompressible.

10. The tensioner of claim 1 wherein the spherical elements are formed of metal.

11. A mechanical actuator for applying a linear output force, comprising:
    a housing;
    a raceway formed within the housing wherein the raceway comprises a first portion extending in a first direction and a second portion extending in a second direction wherein the first direction is transverse the second direction;
    a plurality of spherical elements disposed in the first and second portions of the raceway, wherein the raceway has a width and the diameter of the spherical elements is approximately the same as the width of the raceway so that the spherical elements are serially aligned within the raceway;
    an input mechanism in operable engagement with a first of the spherical elements in the first portion of the raceway, wherein the input mechanism is configured to drive the first spherical element in the first direction;
    an output mechanism configured to be operably connected with one of the rotatable elements of a belt assembly such that displacement of the output mechanism is operable to adjust tension in the belt assembly;
    mechanism is operably engaged with a second of the spherical elements wherein the output in the second portion of the raceway;
    wherein input mechanism is configured such that operating the input mechanism to drive the first ball in the first direction displaces the second ball in the second direction, which drives the output mechanism in the second direction to provide a linear output force.

12. The mechanical actuator of claim 11 comprising a releasable lock configured to lock the output mechanism in place to impede displacement of the output mechanism against displacement in the second direction.

13. The mechanical actuator of claim 11 wherein the output mechanism comprises a plunger having a first portion disposed within the second portion of the raceway and a second portion extending out of the raceway.

14. The mechanical actuator of claim 11 wherein the output mechanism is a linearly displaceable plunger.

15. The mechanical actuator of claim 11 wherein the raceway comprises a curved pathway that includes the first and second portions.

16. The mechanical actuator of claim 11 wherein the raceway comprises a channel having sidewalls for retaining the spherical elements.

17. The mechanical actuator of claim 11 wherein the input mechanism is threadedly connected with the housing so that rotating the input mechanism in a first rotation direction displaces the first spherical element in the first direction.

18. The mechanical actuator of claim 11 wherein the spherical elements are ball bearings.

19. The mechanical actuator of claim 11 wherein the spherical elements are substantially incompressible.

20. The mechanical actuator of claim 11 wherein the spherical elements are formed of metal.

* * * * *

UNITED STATES PATENT AND TRADEMARK OFFICE
CERTIFICATE OF CORRECTION

PATENT NO. : 11,512,762 B2
APPLICATION NO. : 16/910734
DATED : November 29, 2022
INVENTOR(S) : Kerry O'Mara It is certified that error appears in the above-identified patent and that said Letters Patent is hereby corrected as shown below:

In the Claims

In Claim 11:

| | READS | SHOULD READ |
|---|---|---|
| Line 52 | "mechanism is operably engaged" | --wherein the output mechanism is operably engaged-- |

Signed and Sealed this
Twentieth Day of August, 2024

Katherine Kelly Vidal
*Director of the United States Patent and Trademark Office*